Aug. 1, 1961  F. J. MILLER  2,994,622
COMBINATION SINKER RELEASE AND WEIGHING SCALE
Filed March 12, 1957
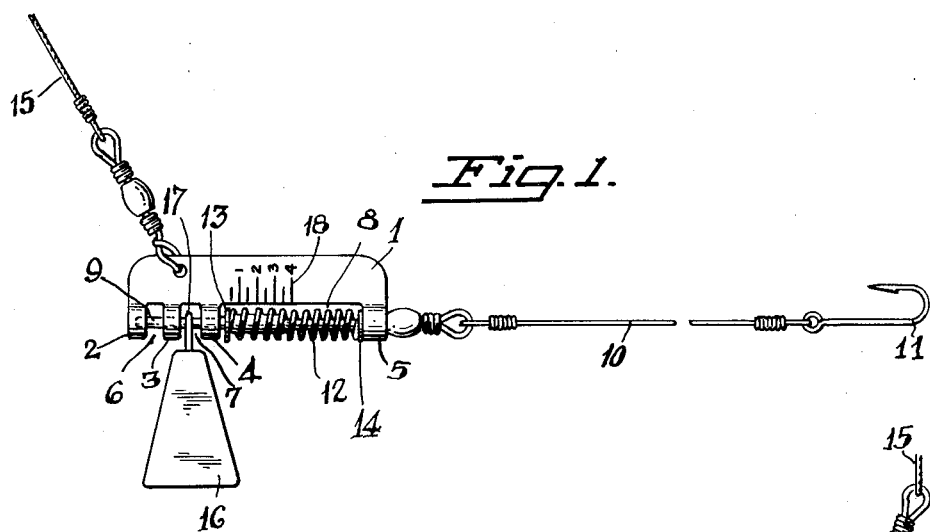
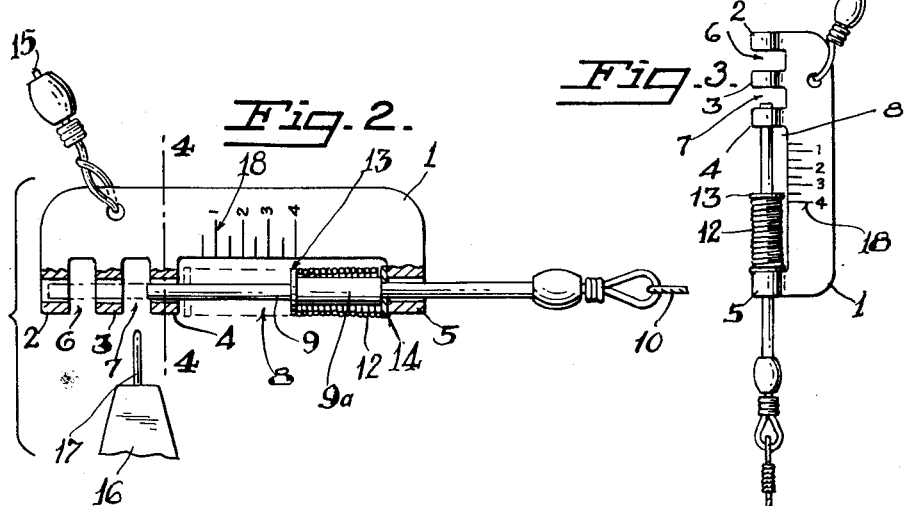
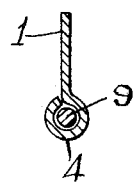
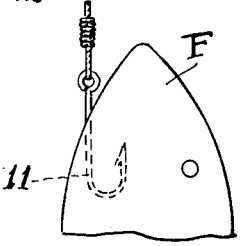
INVENTOR.
FRED J. MILLER
BY
*J. E. Trabucco*
ATTORNEY

United States Patent Office 2,994,622
Patented Aug. 1, 1961

2,994,622
COMBINATION SINKER RELEASE AND
WEIGHING SCALE
Fred J. Miller, 1715 Yosemite Ave., San Francisco, Calif.
Filed Mar. 12, 1957, Ser. No. 645,550
7 Claims. (Cl. 177—226)

This invention relates to improvements in fishing tackle and more particularly to a combination sinker release and weighing scale.

A sinker release of the kind now used by fishermen to automatically release a weighted sinker from a trolling leader when a fish strikes embodies a retractable spring pressed pin connected at one end to the trolling leader. The pin is normally maintained in connected relationship with the weighted sinker by a compression spring, and when a fish of certain size strikes and exerts a predetermined pull on the leader and the pin, the compression spring yields sufficiently to permit the pin to be actuated to a releasing position with respect to the sinker. It is desirable to employ heavy sinkers to carry the trolling leader to depths where larger fish usually feed and light weight sinkers when the fishing activity is to be carried on close to the surface where smaller fish are found. The sinker releases now in use are designed to release the sinker only when a predetermined minimum pull is exerted through the leader on the spring pressed pin, so for this reason such sinker releases are not adapted for use at depths where heavy sinkers are used and also in waters where light weight sinkers are required. It frequently happens with fishing tackle now in common use that the sinker becomes entangled in the line or leader, this being due to the particular construction of the sinker release and the directional forces exerted thereon through the line, leader, and sinker.

The present invention has for its objective the provision of a sinker release which makes it possible to selectively use heavy and comparatively lighter sinkers, depending upon the depth of the waters in which the fishing operation is to be carried on. Since the sinker is lost when jettisoned, savings in the cost of sinkers may be effected through the use of my invention in fishing operations.

Another object of the present invention is to provide a sinker release having a weighing scale embodied therein for weighing fish as they are caught.

Other and further objects of my invention will be pointed out hereinafter or will be indicated in the appended claims or will be obvious to one skilled in the art upon an understanding of the present disclosure. For the purpose of this application, I have elected to show herein certain forms of a combination sinker release and weighing scale embodying my invention; it is to be understood, however, that the embodiment of my invention herein shown and described is for purposes of illustration only and that therefore it is not to be regarded as exhaustive of the variations of the invention.

In the accompanying drawing:

FIG. 1 is a side elevation of a combination sinker release and weighing scale embodying my invention, showing the sinker releasing pin extended and connected to a supported sinker;

FIG. 2 is a similar view showing the pin retracted and the sinker released;

FIG. 3 is a side elevation showing the manner in which the combination sinker release and weighing scale is used to weigh a fish;

FIG. 4 is a sectional view taken on the line 4—4 of FIG. 2.

Referring to the drawing, the numeral 1 designates an elongated plate or member having a plurality of longitudinally aligned eye members 2, 3, 4, and 5 on its lower edge. The eye members 2, 3, and 4 are spaced one from another to form slots or apertures 6 and 7 of substantially the same width. The eye members 4 and 5 are spaced from each other to form a much longer slot or aperture 8. The eye members have longitudinally aligned openings through which an elongated pin 9 slidably extends, such pin being mounted on the eye members and connected at its trailing end to a leader 10, which is secured to a fish hook 11. The pin 9 is supported for reciprocating movement by the eye members, and a coil spring 12 compressed between a fixed collar or protruding member 13 on the pin and the end eye member 5 normally but yieldably maintains the pin in a position extending across the slots or apertures 6, 7, and 8. A cylindrical enlarged portion 9a on the pin 9 is adapted to engage with a washer 14 which abuts the inner side of the end eye member 5 thereby limiting the retractive or rearward movement of the pin. The length of the cylindrical portion 9a and its relative position with respect to the forward end of the pin 9 is such that the forward end of the pin is fully withdrawn from the apertures 6 and 7 when the rear end of the enlarged portion is in abutting relation to the washer 14, as shown by the full lines in FIG. 2. A line 15 is connected to the forwardly disposed end portion of the plate 1 at a point thereon above and near the apertures 6 and 7.

A weighted sinker or weight member 16 having an eye member 17 secured to its upper end is adapted to be connected to the pin 9 either at a point thereon where such pin extends through the aperture 6 or through the aperture 7. The connection of the pin 9 to the eye member 17 of the sinker is accomplished by manually retracting the pin sufficiently to permit the eye member 17 to be inserted into either of the apertures 6 or 7 and positioned therein so the pin will extend through such eye member when it is released and projected forwardly by the compression spring 12. Since it requires a substantially less pulling force in a rearward direction on the pin 9 to withdraw it from the aperture 6 than is required to withdraw it from the aperture 7, a comparatively lighter sinker 16 is usually connected to the pin through the aperture 6 than the sinker ordinarily used with the aperture 7. Thus, if the trolling operation is to be carried on at depths where larger fish usually feed, a heavier sinker is used, and such sinker is connected to the pin at a point where it extends through the aperture 7. The heavier sinker is adapted to carry the trolling leader and the hook 11 to the required depth where larger fish are usually found, and the release of the sinker will then be effected only when a large fish strikes and exerts a pull on the pin sufficient to cause its retraction from the slot 7. On the other hand, when the fishing operation is to be carried on in waters near the surface where smaller fish are expected to be found, a light weight sinker is used, such sinker being attached to the pin 9 through the aperture 6.

It will be noted that by providing a substantially flat elongated plate 1 for the mounting of the retractable pin 9 rather than a tube of the kind now used by others in sinker releases, the line 15 and the leader 10 may be arranged in remote positions with respect the sinker. By this arrangement and also by having the line 15 connected to the forward end of the plate at a point above the sinker, the forces associated with the sinker release are so distributed that it is unlikely that the sinker will become entangled with either the line or the leader during a normal fishing operation.

Marked on the plate 1 in prearranged positions are a plurality of suitably spaced graduation marks 18 which are associated with and used in combination with the collar 13 or other indicating element affixed to the retractable pin 9 to provide a weighing scale for the weighing of fish as they are caught. Certain of the longer marks have the numerals 1, 2, 3, and 4 positioned near them, such marks and numerals being intended to indicate the pounds pressure of the weighing scale. The tension of the compression spring 12 is such that when the pin 9 is retracted through a downward pull on the leader 10 by the weight of a fish F (see FIG. 3), then being weighed, the collar 13 will be moved to a position opposite or nearly opposite one of the graduation marks 18 depending upon the weight of the fish. The position of the collar 13 with respect to the particular indicated graduation mark 18 will indicate the number of pounds pressure exerted upon the spring 12 by the weight of the fish, or, in other words, the weight of the fish. In many states, where the laws do not permit the retention of fish under a minimum weight, it is desirable to have available suitable weighing means permitting a fisherman to weigh a fish soon after it is caught. The present invention makes it possible for each fish to be weighed while it is still held by the hook, thereby readily determining the weight of such fish and whether it may be retained under the law.

The weighing means embodying the present invention may also be employed in determining approximately what weight sinker is to be used for a particular fishing operation.

What I claim is:

1. A combination sinker release and weighing scale comprising an elongated plate having a plurality of spaced depending eye members arranged in longitudinal alignment, the eye members forming a plurality of longitudinally spaced apertures open from below, a retractable weight supporting pin supported for longitudinal reciprocating movement by the eye members and having an indicating member protruding from its sides, the pin normally extending across the apertures but being adapted to move to retracted positions with respect to one or more of such apertures, a depending releasable member encircling the pin and connected to a sinker a coil compression spring confined between one of the eye members and the indicating member yieldably maintaining the pin in a position extending across the apertures, a plurality of spaced graduation marks on the plate arranged in indicating relationship with the indicating member a fishing line connected to the plate, and a fish hook connected to the pin.

2. In a combination sinker release and weighing scale, an elongated pin supporting member having a plurality of depending eye members arranged in longitudinal alignment and in spaced relationship, the eye members forming a plurality of apertures open from below, a retractable weight supporting pin supported for reciprocating movement on the eye members, the pin normally extending across the apertures but being mounted for movement to retracted positions with respect to two of such apertures, a releasable sinker having means extending into one of the apertures and detachably connected to the pin, a protruding member secured to the pin and mounted for movement with the pin in another of said apertures, a compression spring encircling the pin and held under compression between the protruding member and an eye member, the spring being arranged to normally but yieldably maintain the pin in a position extending across the apertures, a fishing line connected to the pin supporting member, and a plurality of spaced graduation marks on the elongated pin supporting member, the said marks being arranged alongside the pin and in predetermined positions opposite the path traversed by the protruding member.

3. In a combination sinker release and weighing scale, an elongated pin supporting member, having a plurality of longitudinally spaced apertures, a retractable weight supporting pin mounted for reciprocating movement on the supporting member, the pin normally extending across the apertures but being adapted to move to withdrawn positions with respect to two of such apertures, a compression spring yieldably maintaining the pin in its normal position, an eye member positioned in one of the apertures and loosely encircling the pin, a sinker suspended from the eye member, an indicating element secured to and carried by the pin and arranged to reciprocate with the pin between certain limits, a fishing line connected to the supporting member, a fish hook connected to the pin, and a plurality of longitudinally spaced marks arranged on the supporting member in predetermined positions adjacent the path traversed by the indicating element, the said marks being arranged in cooperative relationship with the indicating element to indicate the pulling force on the pin when the latter is retracted.

4. In a combination sinker release and weighing scale, an elongated pin supporting member having an aperture adapted to receive a connecting element of a sinker, a retractable weight supporting pin mounted for reciprocating movement on the supporting member, the pin normally extending across the aperture but being adapted to move with the pin to a withdrawn position with respect to the aperture, a compression spring confined under compression between an abutment on the pin and the supporting member for yieldably maintaining the pin in its normal position, an indicating element secured to and carried by the pin and arranged to reciprocate with the pin between certain limits, a plurality of longitudinally spaced marks arranged on the supporting member in predetermined positions adjacent the path traversed by the indicating element, the said marks being arranged in cooperative relationship with the indicating element to indicate the pulling force on the pin when the latter is retracted and a weight suspended from the pin.

5. In a sinker release, an elongated plate having a plurality of depending eye members arranged in longitudinally spaced relation with respect to one another, the eye members being arranged to form spaced apertures in the lower side of the plate, the eye members having openings arranged in longitudinal alignment, two of such eye members being positioned at the forward and rear ends of the plate and another of the eye members being positioned between the end eye member, means on the plate adjacent the forward end thereof and above the eye members for securing a line, a sinker suspended from the pin and having connecting means releasable upon the pin being retracted, a reciprocating retractable pin mounted on the eye members and extending through the openings thereof, the pin normally extending across the apertures but also being adapted to move with the pin to a withdrawn position with respect to at least one of the apertures, the pin having leader attaching means at its rear end, a protruding element secured to the pin and arranged in spaced relation with respect to the rear eye member of the plate, and a compression spring encircling the pin and arranged under compression between the protruding element of the pin and the rear eye member.

6. In a sinker release, an elongated pin supporting member having a plurality of depending eye members arranged in longitudinal alignment and in longitudinally spaced relationship, the eye members forming a plurality of apertures open from below, a retractable weight supporting pin mounted for reciprocating movement on the eye members, the pin normally extending across the apertures but being mounted for movement to retracted positions with respect to at least two of such apertures, a sinker suspended from the pin and having connecting means encircling the pin and releasable when the pin is retracted, and a compression spring normally but yieldably maintaining the pin in a position extending across all of the apertures.

7. In a sinker release, a substantially flat elongated pin supporting member having a plurality of depending eye members arranged in longitudinal alignment and in longitudinally spaced relationship with respect to one another, the eye members forming a plurality of longitudinally spaced apertures open from below, a fishing line connected to an end portion of the supporting member, a retractable weight supporting pin mounted for reciprocating movement on the eye members, the pin normally extending across all of the apertures but being mounted for movement to retracted positions with respect to one or more of such apertures, a protruding member carried on the pin, a fish hook connected to the pin, a compression spring held under compression between the protruding member and one of the eye members, the spring being arranged to normally but yieldably maintain the pin in a position extending across the apertures and a sinker suspended from the pin.

References Cited in the file of this patent

UNITED STATES PATENTS

| | | |
|---|---|---|
| 714,477 | Haenze | Nov. 25, 1902 |
| 1,702,418 | Seebeck | Feb. 19, 1929 |
| 2,392,335 | Morrill | Jan. 8, 1946 |
| 2,458,811 | Von Koscielski | Jan. 11, 1949 |
| 2,562,054 | Mathieu | July 24, 1951 |
| 2,716,832 | Minnie | Sept. 6, 1955 |